United States Patent [19]

Sims

[11] Patent Number: 4,494,294
[45] Date of Patent: * Jan. 22, 1985

[54] METHOD OF MANUFACTURE OF HYDRAULIC CYLINDERS UTILIZING BRONZE OVERLAYS FOR ENGAGING SURFACES

[76] Inventor: James O. Sims, Rte. #2, Box 246, Hartselle, Ala. 35640

[ * ] Notice: The portion of the term of this patent subsequent to Mar. 13, 2001 has been disclaimed.

[21] Appl. No.: 512,537

[22] Filed: Jul. 11, 1983

Related U.S. Application Data

[63] Continuation of Ser. No. 310,630, Oct. 13, 1981, Pat. No. 4,435,893.

[51] Int. Cl.³ .................. B23P 17/00; B23P 15/00
[52] U.S. Cl. .................... 29/412; 29/417; 29/156.4 R; 29/527.2; 219/76.14
[58] Field of Search .......... 29/412, 417, 527.2, 29/156.5, 156.4; 219/76.1, 76.14, 76.15; 82/57, 2.5, 53.1

[56] References Cited

U.S. PATENT DOCUMENTS

| 1,217,633 | 2/1917 | Putnam | 29/149.5 |
| 2,877,540 | 3/1959 | Austen | 29/527.2 |
| 2,912,562 | 11/1959 | Donovan | 219/76.14 |
| 2,968,865 | 1/1961 | Rey | 29/156.4 R |
| 3,095,130 | 6/1963 | Schultz | 82/2.5 |
| 3,156,968 | 11/1964 | White | 219/76.14 |
| 3,703,112 | 11/1972 | Selby | 82/2.5 |
| 3,808,956 | 5/1974 | Knapp | 29/156.4 |
| 3,947,607 | 3/1976 | Gazzard et al. | 219/76.15 |
| 4,221,141 | 9/1980 | Oliver | 82/2.5 |
| 4,233,490 | 11/1980 | Shalai et al. | 219/76.1 |

FOREIGN PATENT DOCUMENTS 1463752 2/1977 United Kingdom ............ 219/76.14

Primary Examiner—Howard N. Goldberg
Assistant Examiner—Steven E. Nichols
Attorney, Agent, or Firm—C. A. Phillips

[57] ABSTRACT

The method of manufacture of a hydraulic cylinder in which a piston for the cylinder is formed from a steel workpiece which is rotated and a bronze overlay fused into its surface while it is rotating, the overlay being continuously monitored and machined to a precise diameter. Thereafter, spaced ring grooves are cut into the piston.

9 Claims, 5 Drawing Figures

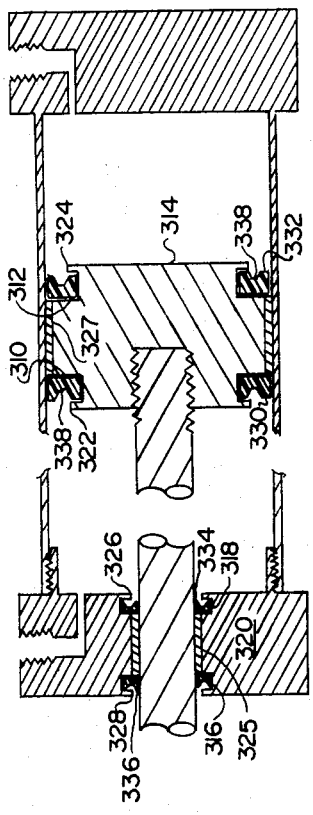
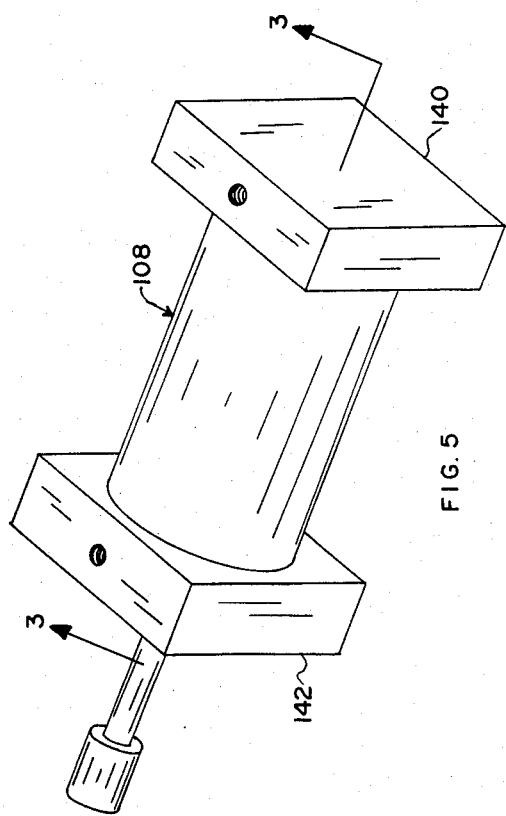
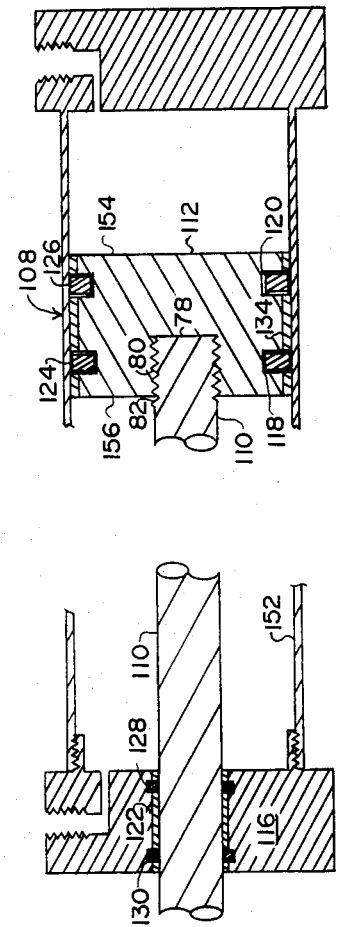

METHOD OF MANUFACTURE OF HYDRAULIC CYLINDERS UTILIZING BRONZE OVERLAYS FOR ENGAGING SURFACES

This is a continuation of application Ser. No. 310,630 filed 10/13/81 now U.S. Pat. No. 4,435,893.

TECHNICAL FIELD

This invention generally relates to fluid-operated cylinders, and particularly to an improved method of their construction.

BACKGROUND ART

For perhaps a hundred years, pistons of fluid-operated cylinders have been constructed of cast iron. While cast iron is a hard material and generally serviceable, it is brittle by nature and not infrequently galling of surfaces occurs, limiting piston life. Further, being of limited strength, pistons of cast iron tend to be unnecessarily long, which unduly lengthens the overall length of a cylinder.

It is the object of this invention to provide an improved method of construction of fluid-operated cylinders.

DISCLOSURE OF THE INVENTION

In accordance with this invention, a cylindrical steel member is rotated about its longitudinal axis, and these steps are performed: a thin layer of bronze of approximately 1/16 inch is fused into the steel surface; next, the thickness of the bronze coating is monitored; next, the surface is machined to a selected overall diameter of the piston to be; and finally, grooves are formed at spaced positions along the surface of a depth which extends through the bronze overlay and into the steel.

By the employment of this method, both a stronger and more serviceable cylinder is constructed. Further, shorter length pistons can be fabricated for the same pressure conditions, and this enables a hydraulic cylinder assembly of a given overall length to have an increased throw.

BRIEF DESCRIPTION OF THE DRAWINGS

FIG. 3 is a longitudinal sectional view taken along line 3—3 of FIG. 5, particularly illustrating the interior construction of a hydraulic cylinder.

FIG. 4 is a longitudinal sectional view similar to that shown in FIG. 3, but wherein the interior construction is of an alternate form.

FIG. 5 is an isometric view of a completed hydraulic cylinder.

DETAILED DESCRIPTION OF THE DRAWINGS

Figures 1, 2:
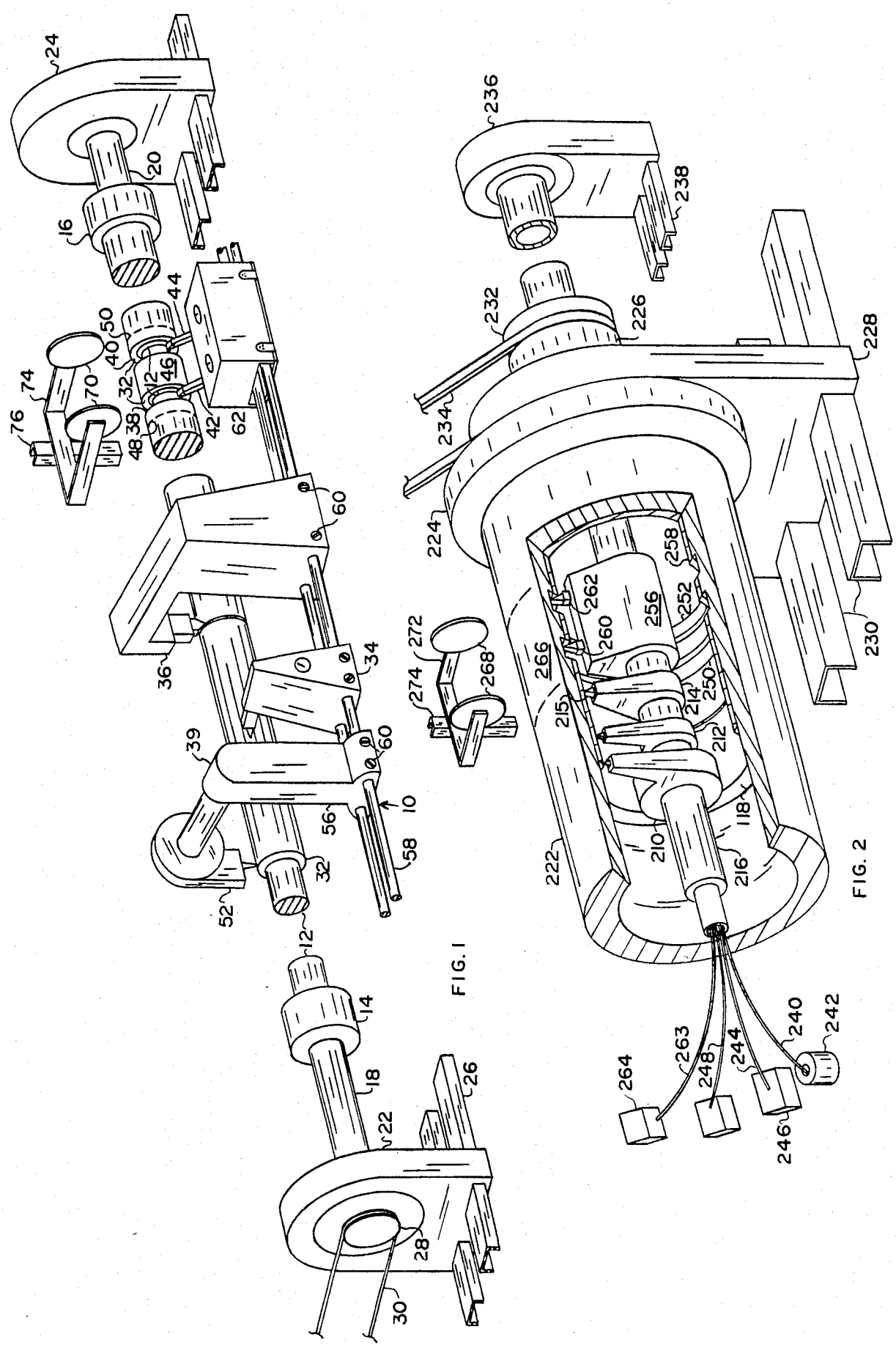
FIG. 1 is an isometric view illustrative of steps of construction employed for hydraulic pistons.
FIG. 2 is an isometric view of steps of construction used to construct a piston rod bearing.

Referring now to the drawings, and initially to FIG. 1, there is shown a construction facility 10 for the fabrication of pistons for a hydraulic cylinder. This drawing is intended to be largely diagrammatic, and the individual elements of the facility are conventional. A solid, cylindrically-shaped steel workpiece 12 is placed in facility 10 and held by collars or collets 14 and 16 connected to stubshafts 18 and 20. Stubshafts 18 and 20 are supported for rotary motion by supports 22 and 24, which are either fixed or movably attached to fixed supports or tracks 26. Stubshaft 18 is rotated via a drive connection to pulley 28, in turn driven by a motor (not shown) through belt 30. Alternately, workpiece 12 would be of an overall length exceeding that of the distance from rotary support 22 to rotary support 24 and would be movable through these supports whereby, progressively, the workpiece would be processed as it is so moved. In such case, both supports 22 and 24 would enable movement of the workpiece through them, and a rotary drive would be effected by a different and compatible means, e.g., as by driven rollers (not shown).

The piston fabrication process employs the following steps: the deposition on steel workpiece 12 of a bronze overlay 32 by wire deposition head 52; the monitoring or measurement of the thickness of overlay 32 by thickness gauge 34 (and therefrom either manually or automatically controlling the depth of deposition); the machining of overlay 32 by machine cutter 36 to a selected diameter; the machining of piston ring grooves 38 and 40 by machine cutters 42 and 44 to a depth which extends through overlay 32 and into steel workpiece 12; and finally, the cutting off of a section of workpiece 12, as piston 46, along dashed lines 48 and 50.

Deposition head 52 (diagrammatically illustrated) is a conventional wire welding head which feeds a bronze wire (not shown) toward the surface of workpiece 12. Then, by means of an electrical arc between the wire and workpiece 12, bronze overlay 32 is deposited on workpiece 12 to an approximate thickness of 1/16 inch (shown exaggerated). Thickness gauge 34, which may be a mechanical or electrical type, monitors the thickness, and by this the rate of thickness buildup by the deposition process, the rate of deposition may be either manually or automatically regulated (by control of wire feed 39) to provide a selected thickness of deposition. Machine cutter 36 is a conventional finishing device which is set to cut the surface of overlay 32 to a depth which would provide a final selected diameter for workpiece 12.

In the case where workpiece 12 is moved longitudinally, for example, to the left, tool post 56, supporting deposition head 52, thickness gauge 34, and machine cutter 36, would all be held stationary by a conventional attachment to a conventional support or track 58, as by lock screws 60. However, where workpiece 12 is not moved longitudinally but is only rotated, conventional means would be provided for moving tool support 56, gauge 34, and machine cutter 36 to the left, in unison, as by moving support or track 58. Alternately, these three elements may be moved to the left, in unison, as by slidable contact on track or support 58 as by a linkage (not shown) between these elements.

Machine cutters 42 and 44 (diagrammatically illustrated) are mounted on a machine support 62 ( also diagrammatically illustrated), and in the case where workpiece 12 is longitudinally moved, machine support 62 may be affixed to a track or support 58 in a fixed longitudinal position with respect to workpiece 12. Machine support 62 would include conventional means in the nature of cross feeds which would operate cutters 42 and 44, whereby they are fed into the surface of workpiece 12, cut the grooves shown to selected depths, and then be withdrawn. During the time in which this procedure is occurring, typically means would be provided for stopping the deposition process and any longitudinal movement of workpiece 12.

In instances where workpiece 12 is not moved longitudinally, but instead tool units are moved, machine support 62, supporting cutters 42 and 44, would be moved on track 58 to each selected position for the cutting of grooves 38 and 40 for each piston to be completed. To enable this, means would be provided to remove machine support 62 from the track or support 58, for example, by the hinged and openable bottom 66 (diagrammatically illustrated).

After grooves 38 and 40 are cut, the final step taken in facility 10 is to effect by saw or saws 70 the severing, along dotted lines 48 and 50, of workpiece 12 to thereby provide discrete piston sections, and thus basically form a piston 46. Saws 70 are diagrammatically illustrated as being held in a holder 74, and are in turn supported by a bracket 76, the saw elements being rotary driven in a conventional manner by pins (not shown). Holder 74 would either be held at a fixed station, where the workpiece is longitudinally moved, or would be longitudinally movable along the workpiece where the latter is longitudinally fixed.

Referring now to FIG. 3, a piston element 112, as severed from workpiece 12, would be attached to a piston rod 110, this being accomplished, for example, by drilling a hole 78 in the end of piston 112. Hole 78 then would be tapped to provide threads 80, a piston rod 110 threaded with threads 82, and the latter threaded into hole 78.

FIG. 3 illustrates a sectional view, taken along line 3—3 of FIG. 5, of a completed cylinder 108. As shown in FIG. 3, piston rod 110 is supported by rod bearing 116, and as will be further described, bearing 116 is constructed following a similar process to that described for the construction of piston 112.

FIG. 2 particularly illustrates the process of forming a rod bearing in accordance with this invention. Workpiece 222, from which rod bearings are formed, is initially a hollow steel cylinder. It is supported by collar or collets 224 at each end (only the right end is shown). Collar or collets 224 are supported by a shaft 226 for rotation in a support 228. Support 228 is either fixed or slidably mounted on track 230 in the same fashion as supports 22 and 24 described above with respect to FIG. 1. The right side shaft 226 includes a pulley 232 which is driven via a belt 234 from a motor (not shown) to thereby effect the rotation of cylindrical workpiece 222.

A tool support shaft 216 is supported by a pair of supports 236 at each end (only one end is shown), and each support 236 is either fixed or slidably mounted on track members 238, as in the case of supports 22 and 24 of FIG. 1. Tool support shaft 216 does not rotate as bronze overlay 118 is applied and it supports, from left to right, deposition head 210, thickness gauge 212, machine cutter 214, containing vertically movable cutting tool 215, and groove cutter 256, containing vertically movable machine cutters 260 and 262. The interior of tool support shaft 216 is hollow, and thus there is enabled a connection to each of these work elements. In this manner, a bronze wire 240 is fed to deposition head 210 from wire supply 242, an electrical lead 244 is connected to an indicator 246 from gauge 212 to enable the remote readout of thickness as measured by thickness gauge 212, and tool control arm 248 is coupled to machine cutter 214 to, in accordance with a standard type of available cutter, effect the cutting position of cutting tool 215 of machine cutter 214 to cut a desired diameter cut into the interior surface 258 of workpiece 222.

Groove cutter 256 is connected in a similar manner as cutter 214, whereby cutting tools 260 and 262 may be raised and lowered via control shaft 263 so as to cut grooves 250 and 252 at an appropriate location in interior surface 258. By relatively longitudinal movement of workpiece 222 and support 228, the sequence of deposition, monitoring of thickness of deposited bronze, and the machining operations are accomplished in a manner as earlier described. The relative movement may be effected by either holding tool support shaft 216 longitudinally constant and longitudinally moving workpiece 222, or vice versa, again, in a manner as described above with respect to the piston construction process.

Following the machining operation of machine cutter 214, ring grooves 250 and 252 are cut in the inner surface 258 of overlay 118 as shown in FIG. 2. Workpiece 222 would be supported as shown on the same or a second rotary support. Machine tool cutters 260 and 262 are part of cutter assembly 256 which is mounted on tool support shaft 216 which, coordinately, may be on the same support shaft 216 or another one where a second facility for rotating workpiece 222 is employed. In either case, tool support shaft 216 is hollow. A control shaft 263 extends through tool support shaft 216 from cutters 260 and 262 to a control 264 whereby the cutting depths of cutters 260 and 262 are controlled in a conventional fashion. With workpiece 254 rotated, cutters 260 and 262 are operated to cut ring grooves 250 and 252, following the performance of the machining operation by machine cutter 214. Where cutter assembly 256 is mounted on the same tool support as deposition head 210, gauge 212 and machine cutter 214, when the groove cutting operation is being performed, deposition head 210 would be disabled and cutting tool 215 of cutter 214 would be withdrawn, enabling the free longitudinal movement of workpiece 222 to appropriate stations for cutting of ring grooves for discrete bearing units 266.

FIG. 2 also illustrates the performance of the step of severing sections of workpiece 222 in discrete bearings 266. Thus, as shown, severing would be accomplished by rotary saws 268 driven (by means not shown) and held by a fixture 272 supported by bracket 274 (by means not shown). Depending on whether or not workpiece 222 is moved longitudinally or tool fixture 216 is moved longitudinally, saw fixture 272 would be either held in a fixed position or mounted for longitudinal movement in order that it be repositioned along workpiece 222 to saw off discrete sections of workpiece 222 to form bearings 266.

FIG. 3 illustrates a cross section of a completed hydraulic cylinder construction 108 wherein both piston 112 and bearing 116 have been formed in accordance with the process described above. By virtue of bronze surfaces 122 and 134, there is provided a working surface against the inner steel surface 152 of cylinder 108 which basically is free of galling and is thus long lasting. By virtue of the fact that inner structure 152 is formed of steel rather than cast iron, the thickness of metal between surface 154 and surface 156 may be significantly reduced over that required for cast iron. In fact, this thickness may be reduced by an approximate factor of 30% for a given pressure differential between the two working surfaces 154 and 156 of piston 112 operating within cylinder 108. This, of course, enables the structure of cylinder 108 from end 140 to end 142 (FIG. 5) to be shorter for the same effective throw or range of longitudinal movement of piston rod 110. Piston 112 and bearing 116 have conventionally equipped ring grooves 118 and 120 and sealing ring grooves 128 and 130, respectively. Typically, the depth of grooves 118 and 120 and thus the cross sectional dimension of sealing rings 124 and 126 would be conventional. These rings may either be circular in cross section or rectangular in cross section, as shown. Likewise, they may either be of a pliable material, such as neoprene, or may be of standard types of material and of standard configurations.

As a particular feature of this invention, a significantly different and new type of groove/ring combination has been determined. It is illustrated in FIG. 4 wherein both piston 314 and bearing 320 are modified in accordance with this feature, each having a bronze overlay 325 and 327. Thus, outer walls 322 and 324 of piston ring grooves 310 and 312 are machined to a reduced diameter, approximately reduced in radius by approximately one-half the depth of a groove. Similarly, the outer walls 326 and 328 of bearing grooves 316 and 318 have been increased in diameter. In terms of the process of construction described above (FIG. 1), cutters 42 and 44 of cutter assembly 62 would be individually laterally movable wherein cutter 62 would effect a machining of the region between groove 38 and left line 48 to the desired reduced diameter, and cutter 44 would effect a machining of the region between groove 40 and right line 50 of piston 46. Alternately, machine cutter 62 would be controlled to cut this reduced diameter at selected regions of workpiece 12.

The bearing cutting facility illustrated in FIG. 2 would be controlled to effect the same process with respect to the machining of bearing 266.

As a still further feature of this invention, a new ring configuration has been determined, and cross sections of it as piston rings 330 and 332 and bearing rings 334 and 336 are shown in coordinate piston ring grooves 310 and 312 and bearing grooves 316 and 318 of FIG. 4. Each of these rings has an annular U-shaped groove 338 cut in it which, in the case of a ring constructed of a flexible material, such as neoprene, increases the ease of stretching it, enabling it to be much more readily inserted in a groove. While this type ring can be employed in the conventional groove as shown in FIG. 3, it has particular applicability to the groove structure shown in FIG. 4 wherein, by virtue of the reduced wall thickness of the outer walls of the grooves, less stretch is required to insert a ring.

The combination of ring and bearing grooves with reduced outer edge walls and ring configuration is particularly significant in that it is believed, for the first time, that rings can be readily insertable without special expansion tools. This means that where there is a ring failure on a job site, a new ring can be inserted without having to take the cylinder to a repair facility having special ring expanders.

From the foregoing, it is believed that there has been described a new and improved method of construction of hydraulic cylinders which should enable a clear break from past construction practices of almost universally constructing pistons and bearings for cylinders of cast iron. The method can be carried out economically, and yet there is produced by it an improved cylinder, one that involves a bronze/steel contact rather than a steel/cast iron contact which, as is well known, is a preferable one. Clearly, it overcomes what has been believed to be a cost advantage in the construction of pistons of cast iron, casting, of course, being normally a relatively cheap process. By the employment of steel rather than cast iron as the base structure for a piston, the thickness of a piston, from one pressure side to another, may be reduced, and thus hydraulic cylinders for the same throw can be constructed of reduced length. This makes them both more economical to produce while achieving a more compact structure. The latter significantly increases the versatility of installation of cylinders, often a significant factor in cylinder use.

I claim:

1. The process of manufacturing components of a fluid-operated cylinder, which cylinder comprises a pair of circular members, an outer, hollow, bearing member and an inner piston member, including the following steps:
   rotating a cylindrical steel member about its central axis;
   fusing onto the rotating steel member a continuous layer of bronze, said bronze being applied by deposition from a bronze wire;
   monitoring the thickness of said bronze layer and controlling the depth of said layer, including the deposition to a minimum thickness of 0.031 inch;
   machining the surface of said bronze layer to a selected diameter and finish; and
   cutting a series of spaced grooves through said bronze layers into the steel of said steel member, said grooves being cut to selected depths and widths;
   whereby a discrete one of said circular members of a said cylinder is fabricated.

2. A method as set forth in claim 1 wherein the step of rotating said steel member is performed in a fixed axial position, and the fusing, monitoring, and machining steps are effected along said central axis in relation to said steel member.

3. A method as set forth in claim 1 wherein the steps of fusing, monitoring, and machining are performed in an axially fixed position, and said rotating steel member is moved parallel to said axis of said rotating steel member.

4. A method as set forth in claim 1 wherein said inner piston is constructed from a said steel member, and wherein said grooves comprise first and second spaced grooves in opposite end regions of said piston.

5. A method as set forth in claim 2 wherein said inner piston is constructed from a said steel member, and wherein said grooves comprise first and second spaced grooves in opposite end regions of said piston.

6. A method as set forth in claim 3 wherein said inner piston is constructed from a said steel member, and wherein said grooves comprise first and second spaced grooves in opposite end regions of said piston.

7. A method as set forth in claim 4 wherein end regions of said piston outboard of said grooves are of a diameter less than the mid diameter of said piston and greater than the diameter of the portions of said piston having a groove.

8. A method as set forth in claim 1 further comprising the steps of:
   rotating an annular hollow steel member about its central axis;
   fusing onto the interior surface of said rotating hollow member a layer of bronze having a minimum thickness of 0.031 inch ;
   monitoring the thickness of said last-named bronze layer;

machining the surface of said last-named bronze layer to a selected diameter and finish; and cutting a series of spaced grooves through said last-named bronze layer, said last-named grooves being cut to selected depths and widths; and whereby a bearing for a said cylinder is manufactured.

9. A method as set forth in claim 8 wherein said outer bearing member includes first and second spaced grooves in opposite end regions of said bearing, and wherein end regions of said bearing outboard of said grooves are of a diameter greater than the mid diameter of said bearing and less than the diameter of the portions of said bearing having a groove.

* * * * *